US008881161B1

(12) United States Patent
Chudgar et al.

(10) Patent No.: US 8,881,161 B1
(45) Date of Patent: Nov. 4, 2014

(54) OPERATING SYSTEM WITH HARDWARE-ENABLED TASK MANAGER FOR OFFLOADING CPU TASK SCHEDULING

(75) Inventors: Keyur Chudgar, Santa Clara, CA (US); Vinay Ravuri, Cupertino, CA (US); Loc Nhin Ho, San Jose, CA (US); Tushar Tyagi, Milipitas, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 802 days.

(21) Appl. No.: 12/695,953

(22) Filed: Jan. 28, 2010

(51) Int. Cl.
G06F 9/46 (2006.01)
G06F 9/455 (2006.01)

(52) U.S. Cl.
USPC .............................................. 718/103; 718/1

(58) Field of Classification Search
CPC ............ G06F 9/455; G06F 9/52; G06F 9/461
USPC .............................................. 718/1, 104, 108
See application file for complete search history.

(56) References Cited

U.S. PATENT DOCUMENTS

| 5,293,620 | A * | 3/1994 | Barabash et al. ............. 718/102 |
| 6,058,389 | A * | 5/2000 | Chandra et al. ....................... 1/1 |
| 7,310,649 | B1 * | 12/2007 | Ginsberg .............................. 1/1 |
| 7,418,576 | B1 * | 8/2008 | Lindholm et al. ............. 712/214 |
| 8,010,966 | B2 * | 8/2011 | Jeter et al. ....................... 718/102 |
| 2003/0005114 | A1 * | 1/2003 | Shavit et al. ................... 709/225 |
| 2005/0216635 | A1 * | 9/2005 | Nishimura ..................... 710/260 |
| 2005/0278502 | A1 * | 12/2005 | Hundley ......................... 712/34 |
| 2007/0005947 | A1 * | 1/2007 | Chartrand et al. ................. 713/1 |
| 2008/0077926 | A1 * | 3/2008 | Jeter et al. ....................... 718/102 |
| 2008/0155197 | A1 * | 6/2008 | Li et al. .......................... 711/130 |
| 2009/0019450 | A1 * | 1/2009 | Mori et al. ..................... 718/105 |
| 2010/0223213 | A1 * | 9/2010 | Su et al. .......................... 706/12 |
| 2010/0242014 | A1 * | 9/2010 | Zhu ................................ 717/106 |

* cited by examiner

Primary Examiner — Thomas Lee
Assistant Examiner — Phil Nguyen
(74) Attorney, Agent, or Firm — Amin, Turocy & Watson, LLP (57) ABSTRACT

An operating system (OS) is provided including a hardware-based task scheduler, with a method for managing OS sourced tasks to be performed by a central processing unit (CPU). An OS, partially enabled as software instructions stored in a computer-readable medium and executed by the CPU, generates CPU tasks. The CPU tasks are buffered in a computer-readable task database memory. CPU task IDs associated with the buffered CPU tasks are enqueued in a CPU queue. Subsequently, the CPU dequeues a first task ID from the CPU queue, and accessing a first CPU task from the task database associated with the first CPU task ID. The CPU delivers the first CPU task to the OS. The OS generates the CPU instructions needed to perform the first CPU task, and sends the CPU instructions to the CPU for performance.

20 Claims, 7 Drawing Sheets

TASK DATABASE 314

| CPU TASK ID | TASK GROUP ID | TASK CONTEXT INFORMATION | TASK PRIORITY | TASK SCHEDULING POLICY | TASK STATE | TASK RESOURCE REQUIRE- MENTS AND AVAILABILITY | TASK ADDRESS SPACE | TASK STACK SIZE | TASK CPU MASS |
|---|---|---|---|---|---|---|---|---|---|
| FIRST | 100111 | 101010 | FIRST | 001011 | 010010 | 111000 | 001011 | 111110 | 000011 |
| SECOND | | | | | | | | | |
| ... | | | | | | | | | |
| nTH | | | | | | | | | |

Fig. 8 ium and executed by the CPU, generates CPU tasks.

OPERATING SYSTEM WITH HARDWARE-ENABLED TASK MANAGER FOR OFFLOADING CPU TASK SCHEDULING

BACKGROUND OF THE INVENTION

1. Field of the Invention

This invention generally relates to computer operating systems (OSs) and, more particularly, to an OS with the capability to offload central processing unit (CPU) task scheduling to a hardware device.

2. Description of the Related Art

As noted in Wikipedia, an operating system (OS) is an interface between hardware and user that is responsible for the management and coordination of activities and the sharing of the resources of a computer, that acts as a host for computing applications run on the machine. As a host, one of the purposes of an operating system is to handle the resource allocation and access protection of the hardware. This relieves application programmers from having to manage these details.

Operating systems offer a number of services to application programs and users. Applications access these services through application programming interfaces (APIs) or system calls. By invoking these interfaces, the application can request a service from the operating system, tem, pass parameters, and receive the results of the operation. Users may also interact with the operating system with some kind of software user interface like typing commands by using command line interface (CLI) or using a graphical user interface. For handheld and desktop computers, the user interface is generally considered part of the operating system. On large multi-user systems like Unix and Unix-like systems, the user interface is generally implemented as an application program that runs outside the operating system. While servers generally run Unix or some Unix-like operating system, embedded system markets are split amongst several operating systems, although the Microsoft Windows line of operating systems has almost 90% of the client PC market.

Multitasking refers to the running of multiple independent computer programs on the same computer; giving the appearance that it is performing the tasks at the same time. Since most computers can do at most one or two things at one time, this is generally done via time-sharing, which means that each program uses a share of the computer's time to execute.

An operating system kernel contains a piece of software called a scheduler which determines how much time each program will spend executing, and in which order execution control should be passed to programs. Control is passed to a process by the kernel, which allows the program access to the CPU and memory. Later, control is returned to the kernel through some mechanism, so that another program may be allowed to use the CPU. This so-called passing of control between the kernel and applications is called a context switch.

An early model which governed the allocation of time to programs was called cooperative multitasking. In this model, when control is passed to a program by the kernel, it may execute for as long as it wants before explicitly returning control to the kernel. This means that a malicious or malfunctioning program may not only prevent any other programs from using the CPU, but it can hang the entire system if it enters an infinite loop.

The philosophy governing preemptive multitasking is that of ensuring that all programs share time on the CPU. This implies that all programs must be limited in how much time they are allowed to spend on the CPU without being interrupted. To accomplish this, modern operating system kernels make use of a timed interrupt. A protected mode timer is set by the kernel which triggers a return to supervisor mode after the specified time has elapsed. On many single user operating systems cooperative multitasking is perfectly adequate, as home computers generally run a small number of well tested programs.

Figure 1:
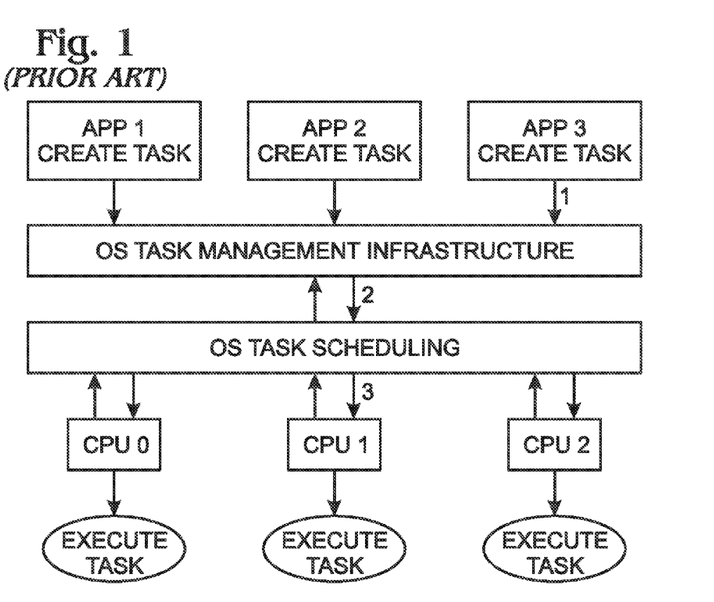
FIG. 1 is a schematic diagram depicting a computer system with a plurality of software applications, an OS, and a plurality of CPUs (prior art).

FIG. 1 is a schematic diagram depicting a computer system with a plurality of software applications, an OS, and a plurality of CPUs (prior art). An operating system may use a number of different scheduling algorithms. Some examples of these algorithms include strict priority, weighted round robin, deficit round robin, and simple round robin. All the algorithms run under the control of software module in the OS.

Figure 2:
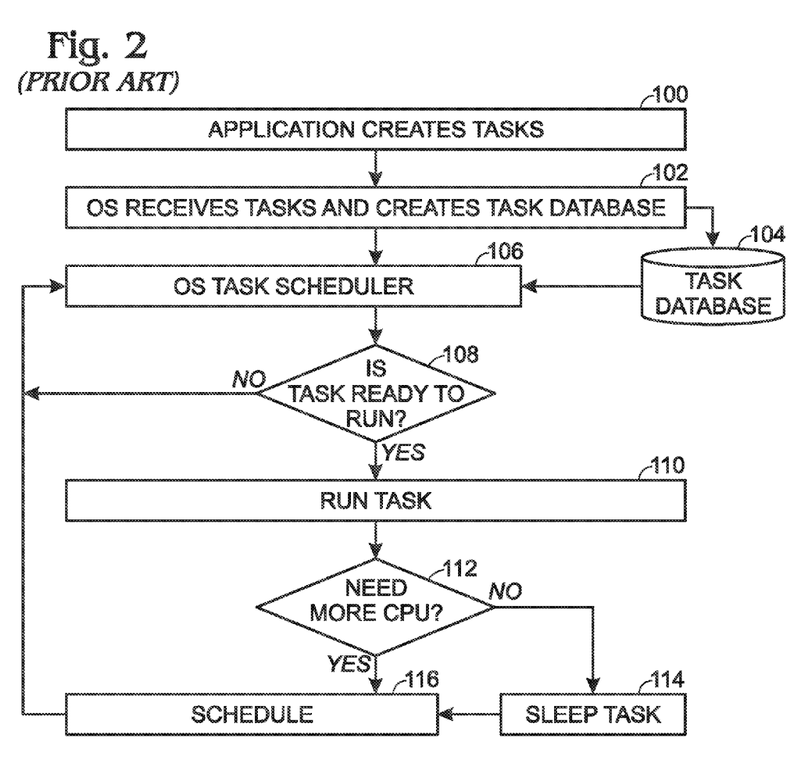
FIG. 2 is a flowchart illustrating the performance of task scheduling in the system of FIG. 1 (prior art).

FIG. 2 is a flowchart illustrating the performance of task scheduling in the system of FIG. 1 (prior art). In Step 100 an application creates a task. In Step 102 the OS receives the task and creates a task database in Step 104. In Step 106 the OS task schedules accesses a task form the task database. A determination is made in Step 108 if the task is ready to be performed. If yes, the task is performed in Step 110. A determination is made in Step 112 if more CPU time is needed. If no, the task is ended (sleep task) in Step 114. Otherwise, more CPU time is scheduled in Step 116, and the flowchart returns to Step 106.

In today's fast packet processing requirement, sometimes the task scheduling becomes as computationally intensive as processing the packet, creating a large overhead. This overhead makes the system very slow as CPU is busy performing the scheduling algorithms in the background. Regardless of the algorithm used, and how much the software algorithm is optimized, there is always going to be some overhead for software-based scheduling, as scheduling is a process that must be supported by the CPU.

In addition, the system of FIG. 1 does not scale well across multiple CPUs. It is difficult for the OS to provide infrastructure for task grouping, task hierarchy, and task distribution to multiple cores at runtime depending upon the application. Such as system cannot create pipeline processing of tasks across CPUs for task processing parallelism, and it can't work with multiple operating systems running in multiprocessor or uniprocessor systems.

It would be advantageous if more CPU time could be made available by reducing the number of CPU operations needed to support OS task scheduling.

It would be advantageous if the OS could at least partially offload task scheduling to a hardware device that operates independently of the CPU.

SUMMARY OF THE INVENTION

Disclosed herein are a system and method for reducing the number of instructions that must be performed by an operating system (OS) in the performance of central processing unit (CPU) task scheduling. As a result, the overall number of CPU instructions that must be executed at runtime is reduced. Further, by removing scheduling algorithms from the OS, the OS code size is likewise reduced. Rather, the task scheduling is performed in queue management hardware, using a strict protocol (SP), weighted round robin (WRR), deficit round robin (DRR), or some other scheduling algorithm. While hardware is performing scheduling algorithms for the OS, the CPU is free to perform other tasks.

Accordingly, an OS is provided including a hardware-based task scheduler, with a method for managing OS-sourced tasks to be performed by a CPU. An OS, partially enabled as software instructions stored in a computer-readable medium and executed by the CPU, generates CPU tasks.

The CPU tasks are buffered in a computer-readable task database memory. CPU task IDs associated with the buffered CPU tasks are enqueued in a CPU queue. Subsequently, the CPU dequeues a first task ID from the CPU queue, and accesses a first CPU task from the task database associated with the first CPU task ID. The CPU delivers the first CPU task to the OS. The OS generates the CPU instructions needed to perform the first CPU task, and sends the CPU instructions to the CPU for performance.

In one aspect, enqueuing the first CPU task ID includes accessing a task priority field in the first CPU task, and enqueuing the first CPU task ID in a first CPU queue, selected from a plurality of parallel CPU queues. The first CPU task queue is associated with the task priority field. The first CPU task ID may be dequeued from the CPU queue using an algorithm such as round robin, weighted round robin, deficit round robin, strict priority, or time slice-based scheduling. In another aspect, a task CPU ID field is accessed in the first CPU task, and the first CPU task ID is enqueued in a CPU queue, selected from a plurality of parallel CPU queues, associated with a particular CPU.

Additional details of the above-described method, and an operating system with a hardware-enabled central processing unit queue for CPU task scheduling, are provided below.

DETAILED DESCRIPTION

As used in this application, the terms "component," "module," "system," and the like are intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 3:
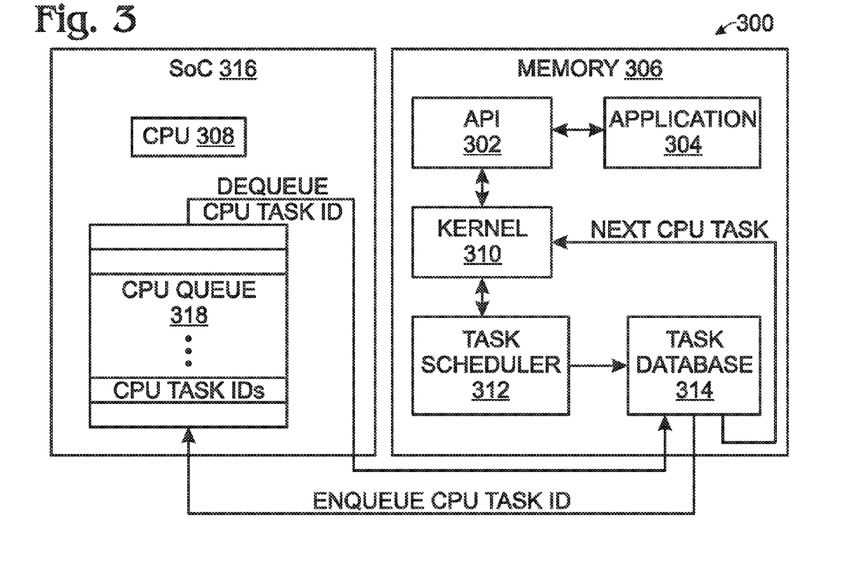
FIG. 3 is a schematic block diagram of an operating system (OS) with a hardware-enabled central processing unit (CPU) queue for CPU task scheduling.

FIG. 3 is a schematic block diagram of an operating system (OS) with a hardware-enabled central processing unit (CPU) queue for CPU task scheduling. The OS 300 comprises an application programming interface (API) 302 to receive service requests from a software application 304 stored in a computer-readable memory 306 and executed by a CPU 308. The OS 300 also comprises a kernel 310 of software instructions stored in computer-readable memory 306 and executed by CPU 308, for converting the service requests into CPU tasks and performing scheduled CPU tasks. A CPU task is very generic term that may encompass background tasks such as garbage collection, background jobs submitted by users like running makefiles, system monitoring, software interrupts, threads, network programs, server programs, and client programs.

The OS 300 further comprises a task scheduler 312 cross-referencing CPU tasks to CPU task IDs. The task scheduler 312 manages a task database 314 stored in the computer-readable memory 306 by exporting CPU tasks to the task database and enqueuing CPU tasks. Note: the exporting of CPU tasks to the task database 314, and the enqueuing of CPU tasks IDs are operations that are supported by the CPU. In one aspect, the task scheduler 312, also known as a task control block (TCB), adds fields to each CPU task such as a task database index field, task priority field, task CPU ID field, or combinations of the above-mentioned fields.

Although only a single application is shown (304) for simplicity, it should be understood that OS API 302 may be in communication with a plurality of applications, not shown. Also for convenience, a single memory 306 is shown. It should be understood, however, that the OS, task database, and application need not all reside in the same memory.

A system-on-chip (SoC) 316 includes the CPU 308 and a CPU queue 318 for enqueuing CPU task IDs received from the task scheduler 312. The CPU task IDs may move from the input of the queue 318, to the output in response to a clock signal (not shown). For example, the CPU dequeues a first CPU task ID from the CPU queue 318, accesses the task database 314 to recover a next scheduled CPU task associated with the first CPU task ID, and sends the next scheduled CPU task to the kernel 310. Then, the kernel generates a plurality of CPU instructions associated with the next scheduled CPU task, as is conventional, and sends them to the CPU 308 for performance.

There are many types of OSs known in the prior art, and even the same OS may be modeled differently. The OS of FIG. 3 is not necessarily intended to describe a complete OS, as there are other OS functions that have not been mentioned that are outside the scope of this disclosure. Some of these other functions may include physical and virtual memory management, file system management, process management, hardware interaction, user program execution, and other miscellaneous jobs. A practitioner skilled in the art could fully enable the OS of FIG. 3 to perform these, and other unmentioned functions, using conventional software modules.

Figure 4:
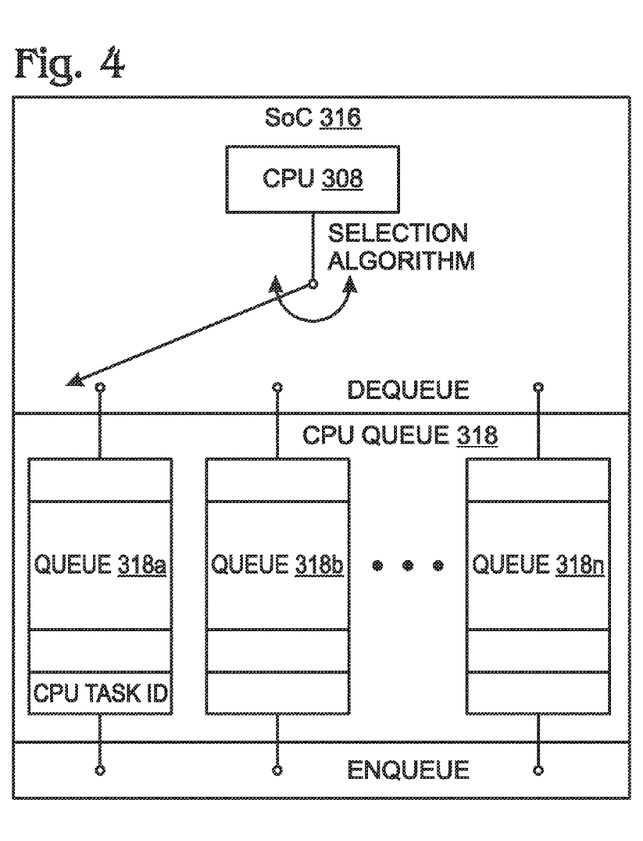
FIG. 4 is a schematic block diagram depicting a first variation of the OS of FIG. 3.

FIG. 4 is a schematic block diagram depicting a first variation of the OS of FIG. 3. Typically, the task scheduler adds a task priority field to each CPU task, and enqueues the first CPU task ID in a first CPU queue (e.g., queue 318a), selected from a plurality of parallel CPU queues (e.g., queues 318a through 318n), where the first CPU queue is associated with the first task priority. The variable n is not limited to any particular value. As explained in more detail below, queues 318a-318n may represent physical, virtual, or a combination of physical and virtual queues. For example, the first CPU queue may have the highest priority, and depending on the dequeuing algorithm used, the CPU may dequeue CPU tasks IDS from the first CPU more often than from another parallel queue. Thus, the CPU tasks IDs would move through the first CPU queue faster than through the other queues, and CPU tasks associated with task IDs in the first CPU queue would be performed more quickly. The CPU 308 may dequeue the first CPU task ID from the CPU queue using an algorithm such as round robin, weighted round robin, deficit round robin, strict priority, or time slice-based scheduling. However, this is not an exhaustive list of every algorithm known in the art.

Figure 5:
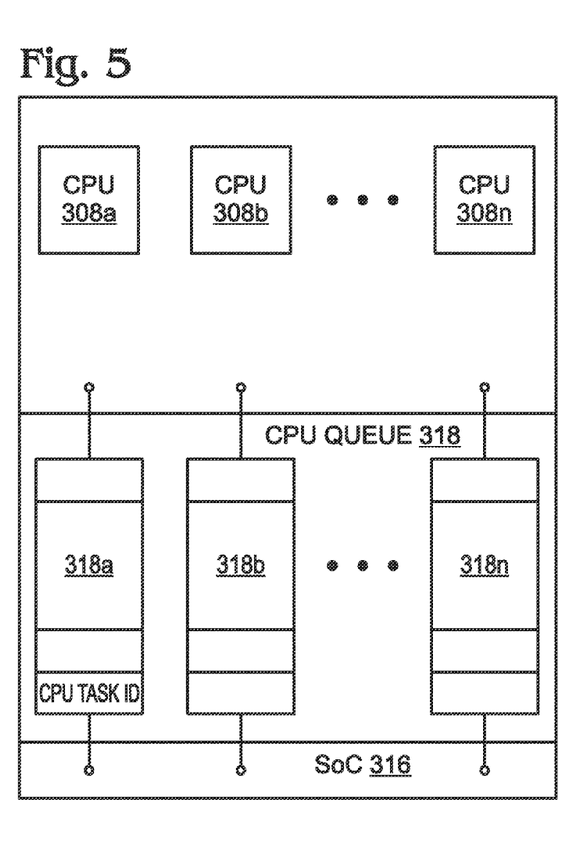
FIG. 5 is a schematic block diagram depicting a second variation of the OS of FIG. 3.

FIG. 5 is a schematic block diagram depicting a second variation of the OS of FIG. 3. In this aspect the SoC 316 includes a plurality of CPUs. Shown are CPUs 308a through 308n, where n is a variable not limited to any particular value. Also in this aspect, the kernel 310 adds a CPU ID field to each CPU task. Then for example, the task scheduler accesses the CPU ID field in the first CPU task, reads a first CPU ID, and enqueues the first CPU task ID in a first CPU queue (e.g. queue 318a), selected from a plurality of parallel CPU queues (318a through 318n), where the first CPU queue (318a) is associated with the first CPU (308a). Note: although a one-to-one correspondence is shown between CPUs and CPU queues, this arrangement need not always hold true. For example, a plurality of queues may be associated with a single CPU, and plurality of CPUs may be associated with a single queue, and multiple CPUs may share multiple queues.

Figure 6:
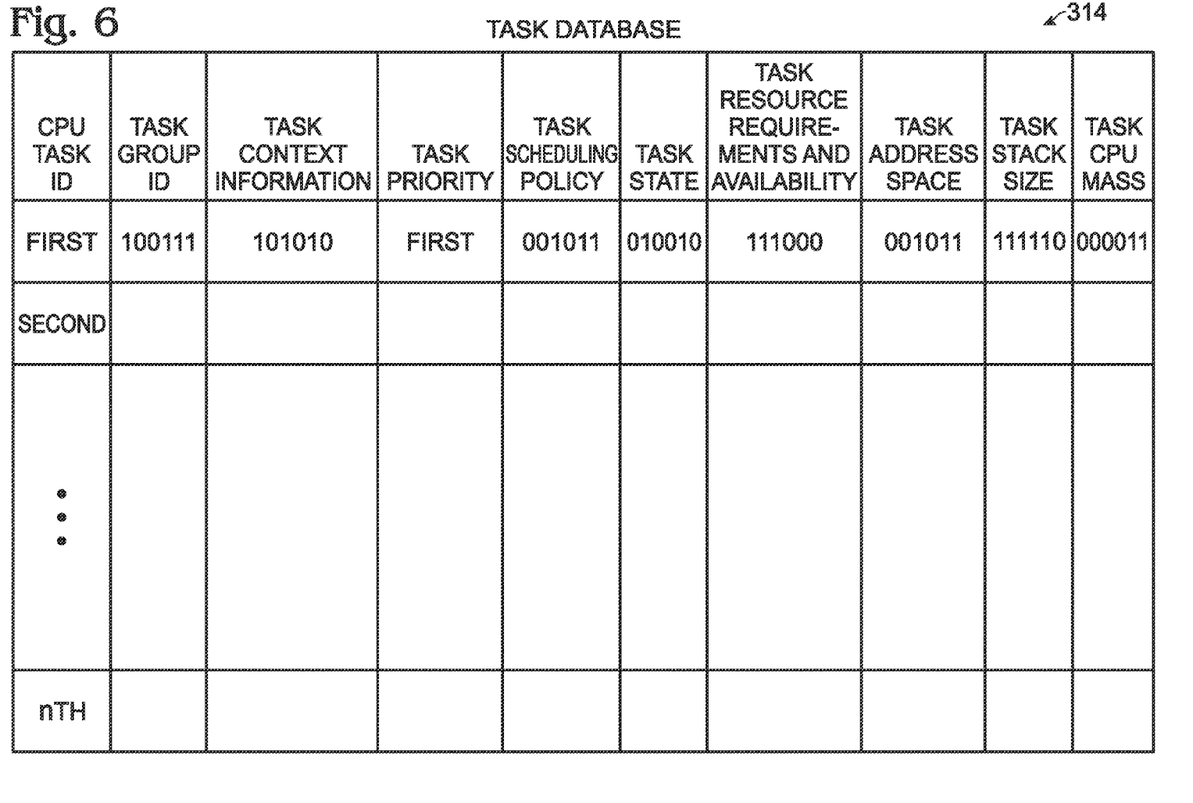
FIG. 6 is a schematic block diagram depicting a third variation of the OS of FIG. 3.

FIG. 6 is a schematic block diagram depicting a third variation of the OS of FIG. 3. In one aspect as shown, the task database 314 includes fields managed by the task scheduler that may include, in addition to the CPU task ID, task group ID, task context information, task priority, task scheduling policy, task state, task resource requirements and availability, task address space, task stack size, task CPU mask, and combinations of the above-mentioned fields. Other fields that may be maintained include task CPU register values, task stack pointer, data section, code section, dynamic memory allocated, and page table entries.

CPU task ID is a unique identification number assigned to a CPU task. Task group ID is a unique identification number of the group in which the task belongs. In one aspect, a task group is a set of tasks that are grouped together on the basis on a common attribute. Task context information is all the information required by system to execute the task. This information includes data such as current CPU register values and interrupt status. Task priority is the priority of task. This field is especially useful if a strict priority scheduling algorithm is used in dequeuing. Task scheduling policy is the dequeuing scheduling algorithm, e.g., strict priority, weighted round robin, deficit round robin, simple round robin, etc. Task state is the current task status, e.g., whether the task blocked, running, can run, idle, etc. Task resource requirements and availability are the resources the task needs to run, like dynamic memory, semaphores, mutex, spinlocks, shared memory, etc. Task address space is the memory space given to a task; the task cannot access anything beyond this memory address space. Task stack size is typically defined in terms of bytes, and is used for local variables and function calls. A task CPU mask is the task the CPU should be scheduled to perform.

In contrast to the conventional definition of an OS as purely software instructions, the OS of FIG. 3 includes the hardware component of a CPU queue 318 and CPU 308. For convenience, the CPU queue 318 is shown embedded in an SoC with a CPU. However, the OS 300 also be understood as a combination of software components and just a hardware queue. Alternately, the OS of FIG. 3 may be understood to be, more conventionally, a collection of software module with a limited function task scheduler module.

In a different aspect, SoC 316 may be understood to be a device for managing OS sourced tasks to be performed by a CPU. In this aspect, the SoC is as shown in FIGS. 3-5, comprising a CPU 308, a CPU queue 318 receiving CPU task IDs for enqueuing from an OS enabled as software instructions stored in a computer-readable memory, and executed by the CPU. In the example explained above, the CPU 308 dequeues a first CPU task ID from the CPU queue 318, accesses a next scheduled CPU task from a task database 314 stored in a computer-readable memory, and sends the next scheduled CPU task to the OS, which in this aspect is understood to be (just) a combination of software modules (e.g., API, kernel, and task scheduler). The CPU 308 receives a plurality of CPU instructions from the OS associated with the next scheduled CPU task.

Functional Description

Figure 7:
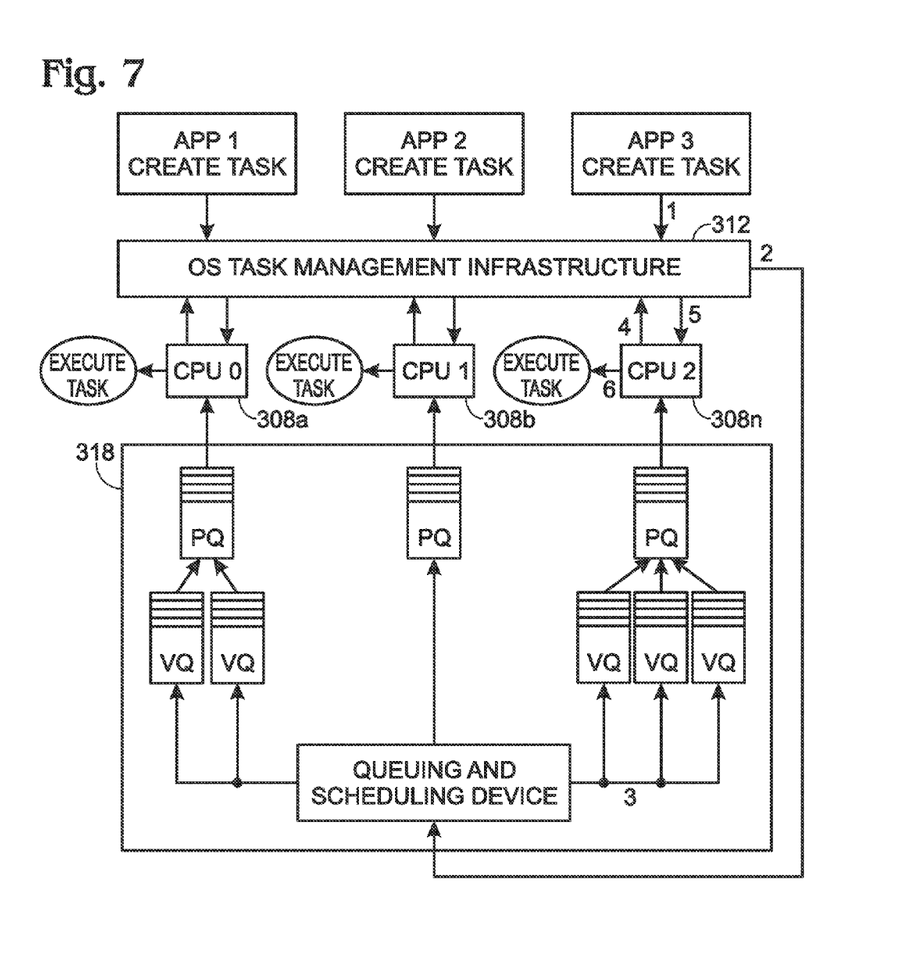
FIG. 7 is a schematic block diagram showing the OS of FIGS. 3-5 from a different perspective.

FIG. 7 is a schematic block diagram showing the OS of FIGS. 3-5 from a different perspective. The OS is able to utilize conventional hardware, e.g., an application-specific integrated circuit (ASIC), which is a general queuing and scheduling device. This device can also be called a queue manager. Such an ASIC may include a CPU for enqueuing messages in the queue and dequeuing the message from the queue. The queue manager also supports the virtual queue concept, in that many different virtual queues can be created from a single physical queue. Also, different groups of virtual queues can be created, with groups being assigned to individual physical queues. Each of these physical queues may be linked to any CPU core based on configuration.

By utilizing this queue manager infrastructure, task scheduling can be partially offloaded from the operating system. The operating system has all the information needed to define task priority, task group, hierarchical organization, and the CPU runs this task from a task infrastructure database. From the perspective of the OS, its CPU task scheduling is finished once the task ID is enqueue in the appropriate virtual queue. The queuing, priority handling, hierarchy management, scheduling algorithms, queue status updates to the CPU are subsequently handled by queuing device.

As noted above, the operating system environment still provides a limited function task management infrastructure. The task management infrastructure includes a library to be used by an application to create tasks, delete tasks, assign priorities to tasks, and run the tasks at initialization time, as well as run time. Internally, the operating system environment maintains the status of the task, in a TCB (task control block), which is also referred to herein as a task database. The operating system interacts with the device driver of the scheduling and queuing device for queuing the tasks to get scheduled at later time. No actual task scheduling is performed by operating system.

In multiprocessor systems, task affinity is provided based on classifying the computing or processing requirements, and assigning the task to the queue of the device. Task affinity associates a particular task with a particular queue—in this case through the choice of queue. The queue is always linked to one of the CPUs in the system, and so the device always schedules the task with appropriate processor attached to the queue. Without the OS of FIG. 7, it is very difficult to provide task affinity and process context information for task propagated across the multiple CPUs. In the multiprocessing environment, the OS of FIG. 7 provides the facility for processing the same task by multiple processing in time slicing manner, per processing, functional blocks, or as per the resource requirements and availability. This capacity greatly helps in load balancing as well as improving overall system processing bandwidth by parallel processing or pipeline processing. This OS makes it simple to implement very complex algorithms for task scheduling, queuing, and in multiprocessor environment, task affinity, system load balancing, parallel and pipeline processing.

The following is a description of task scheduling process flow using hardware device scheduling and queuing. Packet processing tasks are used as an example, but the same process flow can be applied to other computing algorithms.

At OS initialization time, or at runtime after getting the proper application environment, the application creates the tasks required for different packet processing purposes. These tasks can include for example, IP forwarder, TCP terminator, IPSec processing, Control path exceptions, etc. These tasks are given appropriate scheduling parameters along with their callback routines at create time. The OS scheduling infrastructure creates appropriate TCBs and assigns appropriate queue IDs to each block. The queue IDs represent the queue to be used for enqueuing and dequeuing. The queue ID can be selected based on various parameters given by the task creation routine. The parameters include what kind of scheduling needed by the task, task priority, task hierarchy, task group, etc.

At runtime, the operating system is given the task ID from hardware to execute. The operating system blindly just receives the task ID from hardware and runs the task. However, it does have a parameter index and queue ID, if in case an analysis of the task is required. The actual scheduling of the tasks is done by the scheduling device. For example, if a packet needs to be processed, the OS classifies the packet and decides which task to make in the ready state from ideal state. If the packet needs to be forwarded, then the IP forwarder needs to be made ready. If packet is sinking with a TCP connection, the TCP terminator needs to get ready.

After deciding the task to be readied, the OS is not expected to run the scheduling algorithms, it just needs to enqueue the control message in the queue found from the TCB. It is the queuing and scheduling device that runs the scheduling algorithms between multiple queues or tasks. A number of different scheduling algorithms may be used. Once the task has an actual slot for running, the scheduling device generates an interrupt to the operating system, and provides task related information, which may include task context and callback routines to execute the task. Note: the actual packets are not queued.

A comparison to conventional packet process also helps illustrate the distinctions between the prior art of the above-described OS. The job of a queue manager is to manage the enqueuing and dequeuing of the messages provided to it. These queues are conventionally used to send and receive packets. For example, when the packet arrives in ingress direction, Ethernet hardware in a conventional system enqueues messages to the QM and the CPU dequeues message from QM. The CPU processes the packet based on information provided in the dequeued message. The information in the message includes packet address, packet length, whether it is a valid packet, and other packet related information.

In contrast, the OS of FIG. 7 uses these queues in a different manner. First, only the CPU enqueues the message (CPU task ID) and only the CPU dequeues the message. Instead of sending the message, which generally contains packet related information, the dequeued message in the OS system of FIG. 7 contains OS task related information. As noted in detail above, the messages queued in the OS of FIG. 7 are merely a task ID number, identifying a task to be preformed, they are not packets. The CPU task itself is not queued. Neither are the specific CPU instructions queued, which are needed to perform the task.

Figure 8:
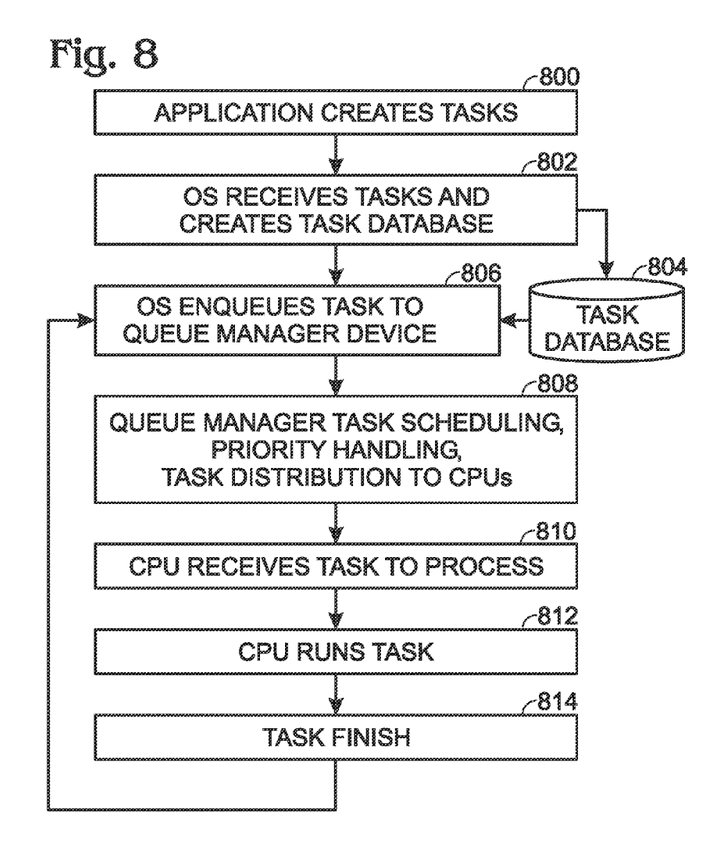
FIG. 8 is a flowchart illustrating the process of task scheduling using the OS of FIG. 7.

FIG. 8 is a flowchart illustrating the process of task scheduling using the OS of FIG. 7. The flowchart of FIG. 8 can be contrasted with the flowchart of FIG. 2 to help clarify distinctions between the OS described herein and the prior art. In Step 800 an application or the OS creates tasks at initialization time, or while system is running. The task is given scheduling and grouping parameters. In Step 802 the OS creates a task structure and saves task related parameters in the task database (Step 804). In Step 806 the OS enqueues the task to the appropriate queue in the queuing and scheduling device. The queue used can be virtual, if the task is in a group of related tasks, or physical, if no hierarchy is needed. In Step 808 the queuing and scheduling device schedules the task, per the scheduling algorithm. In Step 810 an interrupt is generated to the appropriate CPU to process the task. In Step 812 the CPU receives interrupt and notifies the OS to execute the task. In Step 814 the task is finished and the process returns to Step 806.

Figure 9:
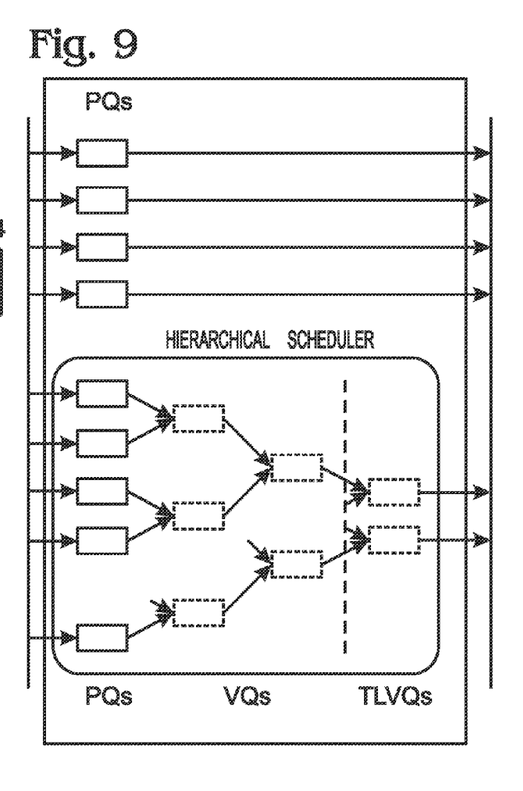
FIG. 9 is a schematic block diagram depicting details of the CPU queue of FIGS. 3-5 and 7.

FIG. 9 is a schematic block diagram depicting details of the CPU queue of FIGS. 3-5 and 7. The queue manager (QM), also known as a queuing and scheduling device or CPU queue, controls the message storage and retrieval processes. The subsystem also provides a mechanism to enqueue and dequeue messages. The QM always acts as a slave device. Simple atomic operations are used to enqueue/dequeue messages to/from a particular queue. All coherency issues are managed by the QM. By "slave device" it is meant that the QM pushes CPU task IDs through a first-in first-out (FIFO) device in response to clock signals acting as a trigger. The action of the QM is not dependent upon the OS, once the task IDs have been inserted at the head of the queue. While the physical queue, or a plurality of parallel physical queues, may be arranged in a more complex system of virtual queues, as explained below, these virtual arrangements are preconfigured and operate without any instructions from the OS.

The QM support 3 types of queuing functions, namely: Physical Queues (PQs); Virtual Queues (VQs); and, Top Level Virtual Queues (TLVQs). A FIFO is an example of a PQ. A TLVQ is a logical queuing point at the top level of the optional hierarchical scheduler. These queues are deemed to be virtual as messages are not physically moved into these queues. A VQ is a logical queuing point between the top and bottom levels of the hierarchical scheduler. Like TLVQs, these queues are deemed to be virtual as messages are not physically moved into these queues.

Figure 10:
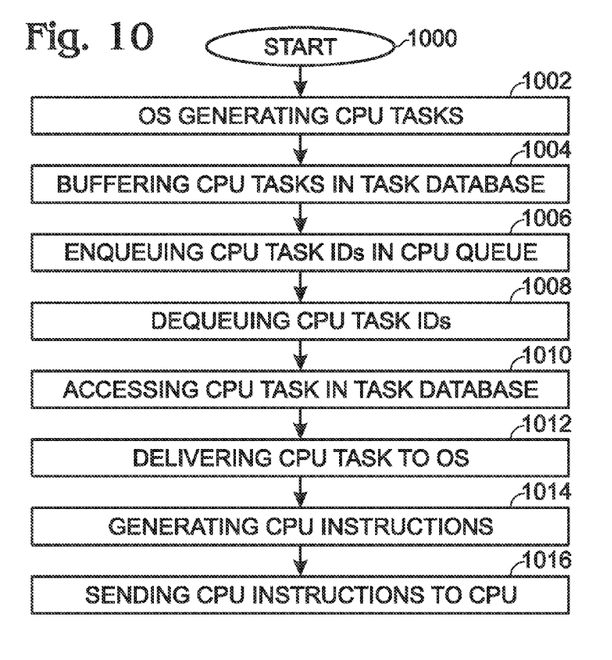
FIG. 10 is a flowchart illustrating a method for managing OS sourced tasks to be performed by a CPU, in the context of an OS including a hardware-based task scheduler.

FIG. 10 is a flowchart illustrating a method for managing OS sourced tasks to be performed by a CPU, in the context of an OS including a hardware-based task scheduler. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 1000.

In Step 1002 an OS, partially enabled as software instructions stored in a computer-readable medium and executed by the CPU, generates CPU tasks. Step 1004 buffers the CPU tasks in a computer-readable task database memory. Step 1006 enqueues CPU task IDs associated with the buffered CPU tasks in a CPU queue. In Step 1008 a CPU dequeues a first task ID from the CPU queue. In Step 1010 the CPU accesses a first CPU task from the task database associated with the first CPU task ID. In Step 1012 the CPU delivers the first CPU task to the OS. In Step 1014 the OS generates CPU instructions needed to perform the first CPU task, and in Step 1016 the OS sends the CPU instructions to the CPU.

In one aspect, enqueuing the CPU tasks IDs in the CPU queue in Step 1006 includes enqueuing the first CPU task ID as follows:
accessing a task priority field in the first CPU task;
enqueuing the first CPU task ID in a first CPU queue, selected from a plurality of parallel CPU queues, where the first CPU task queue is associated with the task priority field.
Alternately, Step 1006 may enqueue the first CPU task ID as follows:
accessing a task CPU ID field in the first CPU task;
enqueuing the first CPU task ID in a first CPU queue, selected from a plurality of parallel CPU queues, associated with a first CPU.

In a different aspect, dequeuing the first CPU task ID from the CPU queue in Step 1008 includes the CPU selecting the first CPU queue using an algorithm such as round robin, weighted round robin, deficit round robin, strict priority, or time slice-based scheduling.

In another aspect, generating CPU tasks in Step 1002 includes generating CPU tasks with fields such as task database index field, task priority field, task CPU ID field, CPU task ID, and combinations of the above-mentioned fields. Step 1004 may buffer CPU tasks with fields such as CPU task ID, task group ID, task context information, task priority, task scheduling policy, task state, task resource requirements and availability, task address space, task stack size, task CPU mask, and combinations of the above-mentioned fields.

Figure 11:
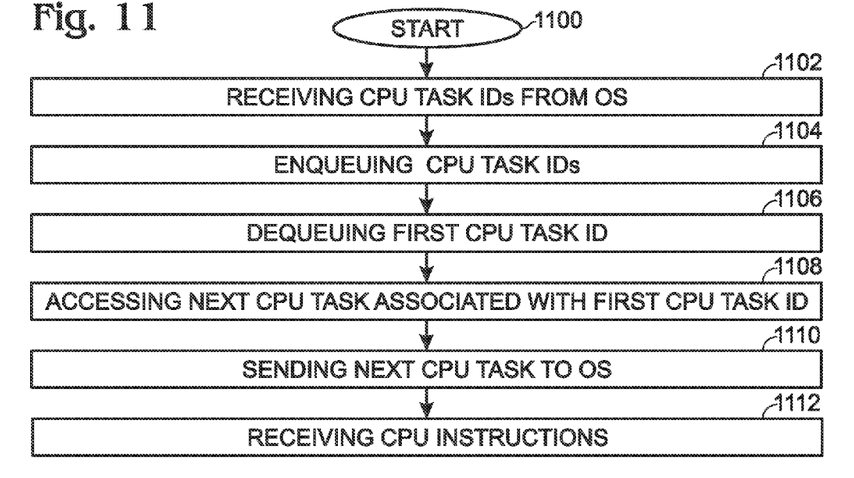
FIG. 11 is a flowchart illustrating a method for managing OS sourced tasks to be performed by a CPU in the context of a system-on-chip (SoC) including the CPU and CPU task queues.

FIG. 11 is a flowchart illustrating a method for managing OS sourced tasks to be performed by a CPU in the context of a system-on-chip (SoC) including the CPU and CPU task queues. The method starts at Step 1100. In Step 1102 an SoC receives CPU task IDs from an off-SoC OS module enabled as software instructions stored in a computer-readable medium, which are executed by the CPU. Step 1104 enqueues CPU task IDs in a CPU task queue for scheduling. In Step 1106 the CPU dequeues a first CPU task ID from the CPU task queue. In response to reading the first CPU task ID, the CPU accessing a next scheduled CPU task in Step 1108. The CPU task is associated with the first CPU task ID, and is accessed from a task database stored in a computer-readable memory. In Step 1110 the CPU sends the next scheduled CPU task to the OS module. The CPU receives a plurality of CPU instructions from the OS in Step 1112, associated with the next scheduled CPU task.

In one aspect, enqueuing the CPU task IDs in the CPU task queue (Step 1104) includes enqueuing the first CPU task ID in a first CPU task queue, selected from a plurality of parallel CPU task queues. Then, dequeuing the first CPU task ID from the CPU task queue (Step 1106) includes the CPU selecting the first CPU task queue using an algorithm such as round robin, weighted round robin, deficit round robin, strict priority, or time slice-based scheduling.

An OS with a hardware-enabled CPU queue for CPU task scheduling has been provided with an associated method. Examples of particular process flows, hardware devices, and software modules have been given to illustrate the invention. However, the invention is not limited to merely these examples. Other variations and embodiments of the invention may occur to those skilled in the art in light of this disclosure.

We claim:

1. A method for managing operating system (OS) sourced tasks to be performed by a central processing unit (CPU), comprising:
receiving, by a system on chip (SoC) from an off-SoC OS module, CPU task IDs associated with respective CPU tasks stored in a task database associated with the OS module;
enqueuing the CPU task IDs in a CPU task queue on the SoC;
dequeuing, by the SoC, the CPU task IDs from the CPU task queue in accordance with a scheduling algorithm that executes on the SoC independently of the OS module and the CPU;
in response to dequeuing a CPU task ID, of the CPU task IDS, from the CPU task queue:
determining, by the CPU, a scheduled CPU task associated with the CPU task ID by accessing the task database, and
sending, by the CPU, notification information to the OS module instructing the OS module to perform the scheduled CPU task; and
receiving, by the CPU, one or more CPU instructions from the OS module,
wherein the one or more CPU instructions are executable by the CPU to perform the scheduled CPU task.

2. The method of claim 1, wherein the enqueuing the CPU task IDs comprises enqueuing the CPU task ID in the CPU task queue selected from a plurality of parallel CPU task queues on the SoC; and
wherein the dequeuing the CPU task ID comprises selecting the CPU task queue using, as the scheduling algorithm, at least one of a round robin algorithm, a weighted round robin algorithm, a deficit round robin algorithm, a strict priority algorithm, or a time slice-based scheduling algorithm.

3. A system-on-chip (SoC) for managing operating system (OS) sourced tasks to be performed by a central processing unit (CPU), comprising:
a CPU; and
a CPU queue configured to receive, from an OS, CPU task IDs associated with respective CPU tasks stored in a task database by the OS;
wherein the CPU is further configured to:

dequeue a CPU task ID, of the CPU task IDs, from the CPU queue based on a scheduling algorithm that executes independently from the OS and the CPU, identify, in response to dequeuing of the CPU task ID, a scheduled CPU task associated with the CPU task ID by referencing the task database, send, in response to the dequeing, a notification to the OS that the scheduled CPU task is to be performed, and receive at least one CPU instruction from the OS, the at least one CPU instruction is executable by the CPU to perform the scheduled CPU task.

4. The SoC of claim 3, further comprising a plurality of parallel CPU queues, comprising the CPU queue, differentiated by task priority.

5. The SoC of claim 3, further comprising a plurality of parallel CPU queues comprising the CPU queue, wherein the CPU is further configured to dequeue the CPU task ID from a selected CPU task queue, of the plurality of parallel CPU task queues, using, as the scheduling algorithm, at least one of a round robin algorithm, a weighted round robin algorithm, a deficit round robin algorithm, a strict priority algorithm, or a time slice-based scheduling algorithm.

6. A system, comprising:
a system-on-chip (SOC); and
an operating system (OS) comprising:
an application programming interface (API) configured to receive service requests from a software application;
a kernel of software instructions executed by a CPU, wherein the kernel is configured to convert the service requests into CPU tasks and perform the CPU tasks; and
a task scheduler configured to associate the CPU tasks with respective CPU task IDs, store the CPU tasks and the CPU task IDs in a task database, and send the CPU task IDs to the system-on-chip to be enqueued,
wherein the system-on-chip (SoC) comprises:
the CPU; and
a CPU queue configured to enqueue the CPU task IDs received from the task scheduler;
wherein the CPU is configured to:
dequeue a CPU task ID, of the CPU task IDs, from the CPU queue according to a scheduling algorithm that operates on the SoC independently from the OS and the CPU,
access the task database to retrieve a scheduled CPU task associated with the CPU task ID, and
send a notification to the kernel instructing the kernel to perform the scheduled CPU task, and
wherein the kernel is further configured to generate at least one CPU instruction associated with the scheduled CPU task and send the at least one CPU instruction to the CPU for execution.

7. The system of claim 6, wherein the task scheduler is further configured to associate a task priority with the CPU task ID, and enqueue the CPU task ID in the CPU queue, selected from a plurality of parallel CPU queues, based on a determination that the CPU queue is associated with the task priority.

8. The system of claim 6, wherein the task scheduler is further configured to associate one or more fields with the CPU task ID, wherein the one or more fields comprise at least one of a task database index field, a task priority field, or a task CPU ID field.

9. The system of claim 6, wherein the SoC comprises a plurality of CPUs comprising the CPU;

wherein the kernel is further configured to associate a CPU ID field with the CPU task ID; and wherein the task scheduler is further configured to access the CPU ID field associated with the CPU task ID, read a CPU ID from the CPU ID field, and enqueue the CPU task ID in the CPU queue, selected from a plurality of parallel CPU queues, based on a determination that the CPU queue is associated with the CPU ID.

10. The system of claim 6, wherein the task database includes one or more fields managed by the task scheduler, and wherein the one or more fields include at least one of a task group ID field, a task context information field, a task priority, a task scheduling policy field, a task state field, a task resource requirements and availability field, a task address space field, a task stack size field, or a task CPU mask field.

11. The system of claim 6, wherein the task scheduler is further configured to select the CPU queue from a plurality of parallel CPU queues for enqueuing of the CPU task ID; and wherein the CPU is further configured to dequeue the CPU task ID from the CPU queue based on a selection, by the scheduling algorithm, of the CPU queue from the plurality of parallel CPU queues, wherein the scheduling algorithm is at least one of a round robin algorithm, a weighted round robin algorithm, a deficit round robin algorithm, a strict priority algorithm, or a time slice-based scheduling algorithm.

12. A method for managing operating system (OS) sourced tasks to be performed by a central processing unit (CPU), the method comprising:

buffering CPU tasks, generated by an OS, in a computer-readable task database memory;

enqueuing CPU task IDs respectively associated with the CPU tasks in a CPU queue residing on a system-on-chip (SoC);

dequeuing, by a CPU on the SoC, a CPU task ID, of the CPU task IDs, from the CPU queue based on a scheduling algorithm that operates on the SoC independently of the OS and the CPU;

in response to the dequeuing, identifying, by the CPU, task information stored in the task database memory, wherein the task information relates to a CPU task associated with the CPU task ID;

delivering, by the CPU, an execution instruction to the OS to perform the CPU task associated with the task information; and receiving, from the OS, one or more CPU instructions that facilitate performance of the CPU task by the CPU.

13. The method of claim 12, wherein the enqueuing the CPU tasks IDs comprises:

accessing a task priority field associated with the CPU task ID;

selecting the CPU queue from a plurality of parallel CPU queues based on a determination that the CPU queue is associated with a priority identified by the task priority field; and enqueuing the CPU task ID in the CPU queue based on the selecting.

14. The method of claim 12, wherein the identifying the task information comprises accessing one or more fields comprising at least one of a task database index field, a task priority field, or a task CPU ID field.

15. The method of claim 12, wherein the enqueuing the CPU task IDs comprises:

reading a CPU ID from a task CPU ID field associated with the CPU task;

selecting the CPU queue from a plurality of parallel CPU queues based on a determination that the CPU queue is associated with the CPU ID; and enqueuing the CPU task ID in the CPU queue based on the selecting.

16. The method of claim 12, wherein the buffering the CPU tasks comprises buffering one or more fields associated with the CPU tasks, wherein the one or more fields comprise at least one of a task group ID field, a task context information field, a task priority field, a task scheduling policy field, a task state field, a task resource requirements and availability field, a task address space field, a task stack size field, or a task CPU mask field.

17. The method of claim 12, wherein the enqueuing the CPU task IDs comprises selecting the CPU queue from a plurality of parallel CPU queues; and wherein the dequeuing the CPU task ID comprises selecting the CPU queue using, as the scheduling algorithm, one of a round robin algorithm, a weighted round robin algorithm, a deficit round robin algorithm, a strict priority algorithm, or a time slice-based scheduling algorithm.

18. The method of claim 12, wherein the buffering the CPU tasks comprises buffering one or more fields associated with the CPU tasks, the one or more fields comprise a task group ID field.

19. The method of claim 12, wherein the buffering the CPU tasks comprises buffering one or more fields associated with the CPU tasks, the one or more fields comprise a task state field.

20. The method of claim 12, wherein the buffering the CPU tasks comprises buffering one or more fields associated with the CPU tasks, the one or more fields comprise a task CPU mask field.

* * * * *